Figure 1:
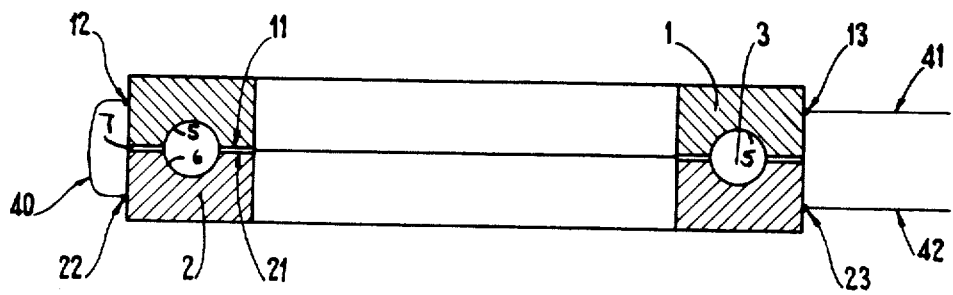

United States Patent [19]
Doucherain et al.

[11] 3,892,505
[45] July 1, 1975

[54] MEANS FOR HEATING A MOLD

[75] Inventors: Jacques Doucherain; Bernard Baumann, both of Paris, France

[73] Assignees: Cebal GP and Societe de Traitements Electrolytiques et Electrothermiques, France

[22] Filed: June 4, 1974

[21] Appl. No.: 476,307

Related U.S. Application Data

[63] Continuation of Ser. No. 232,956, Sept. 17, 1971, abandoned, which is a continuation of Ser. No. 842,132, July 16, 1969, abandoned.

[30] Foreign Application Priority Data

June 23, 1968 France .................... 68.160223

[52] U.S. Cl. ........... 425/41; 425/445; 425/DIG. 13; 219/10.81; 219/8.5; 219/10.57; 219/9.5; 72/342; 425/243; 425/384; 249/78
[51] Int. Cl. ............................................. B29h 5/02
[58] Field of Search ....... 425/40, 41, 42; 219/10.55, 219/10.57, 10.41, 149, 10.81, 8.5, 9.5

[56] References Cited
UNITED STATES PATENTS

| | | |
|---|---|---|
| 808,479 | 12/1905 | Riddle .................... 219/10.57 X |
| 2,066,668 | 1/1937 | Bennett .................... 219/8.5 X |
| 2,325,479 | 7/1943 | Crawford .................... 219/149 |
| 2,495,170 | 1/1950 | Kinn .................... 219/10.57 X |
| 2,508,382 | 5/1950 | Gard .................... 425/DIG. 13 |
| 2,611,152 | 9/1952 | Seifreid .................... 219/10.81 X |
| 2,631,646 | 5/1953 | Gannon et al. .................... 425/DIG. 13 |
| 2,738,406 | 3/1956 | Zaleski .................... 425/41 X |
| 2,920,172 | 1/1960 | Stallard .................... 425/DIG. 13 |
| 3,823,293 | 7/1974 | Gilliatt .................... 425/41 X |

*Primary Examiner*—J. Howard Flint, Jr.
*Attorney, Agent, or Firm*—McDougall, Hersh & Scott

[57] ABSTRACT

A mold for thermoplastic materials and means for heating molds wherein the mold includes at least two electrically conductive mold elements having faces defining a molding cavity, the faces being adapted to be positioned in a face-to-face relation whereby the faces are electrically insulated from each other, conducting means for connecting said elements and means for supplying a high-frequency alternating current to said elements whereby said current flows from one of the elements to the other through the conducting means to generate heat in the elements adjacent the cavity therein.

6 Claims, 2 Drawing Figures

MEANS FOR HEATING A MOLD

This is a continuation, of application Ser. No. 232,956, filed Sept. 17, 1971, now abandoned, and which is in turn a continuation of Ser. No. 842,132, filed July 16, 1969, and now abandoned.

This invention relates to molds for thermoplastic materials and to a means for heating such molds.

Molds adapted to be heated for molding or deforming thermoplastic materials under pressure involve a number of difficult problems in that, because thermoplastic materials are generally poor conductors of heat, the temperatures which must be maintained at the walls of the mold to transfer sufficient heat to the thermoplastic material is increased as the thickness of the thermoplastic material to be molded is increased and as the time allowed for molding is decreased. Thus, the size of the article which can be molded is limited by the amount of heat which can be transmitted through the walls of the mold to the thermoplastic material in the interior of the mold without causing thermal degradation of the thermoplastic material adjacent the walls of the mold.

Moreover, the temperature of the thermoplastic material must be uniform throughout the mold so as to avoid regions of thermoplastic material where the temperature is too low for the thermoplastic material to be in a sufficiently plastic state and regions where the temperature is too high whereby the thermoplastic material is subjected to thermal degradation, resulting in changes in the characteristics and color of the material being molded.

In the prior art, such molds have been heated electrically by providing electrical resistances either in the mold itself or surrounding the mold, or, in a few instances, by induction by means of a high-frequency electrical current.

Heating by means of electrical resistance generally involves automatic regulation of the mold temperature by a thermostat or the like, and thus gives rise to a sawtooth heating cycle. Such a cycle results in serious disadvantages in that there is alternate overheating and underheating of the mass of thermoplastic material in the mold. Moreover, the use of resistance-type heating necessitates excessively long heating and cooling periods, whereby productivity of the molding process is seriously impaired.

On the other hand, heating by induction is advantageous in that it causes heat to be generated in the metal of the mold. However, large water-cooled inductors contribute to the mass of the molds and hence to higher heat losses.

It is accordingly an object of the present invention to provide a new and improved mold and means for heating molds which overcome the aforementioned disadvantages.

It is a further object of the present invention to provide a mold and means for heating molds for thermoplastic materials in which the thermoplastic material may be heated by conduction.

It is yet another object of the present invention to provide a mold and means for heating molds for thermoplastic materials in which a substantially uniform temperature can be maintained throughout the mold surface defining the mold cavity.

It is still another object of the invention to provide a mold and means for heating molds in which the mold can be heated to the desired temperature in a relatively short period of time.

Figure 2:
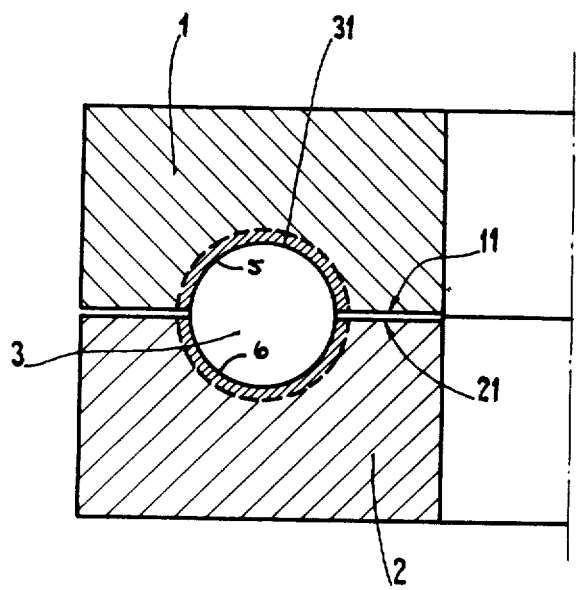

These and other objects and advantages of the invention will appear hereinafter, and for purposes of illustration, but not of limitation, an embodiment of the invention is shown in the accompanying drawing, in which:

FIG. 1 is a cross-sectional view of a mold embodying the features of the invention; and FIG. 2 is an enlarged view of FIG. 1 showing a portion of the mold of FIG. 1.

The invention is concerned with a mold in which heat is generated by the resistance in a localized surface region in the immediate proximity of the internal walls of the mold to thereby supply heat to a thermoplastic material contained in the mold to reduce the thermoplastic material to a plastic state. Since heat is generated in the metal comprising the housing of the mold in a localized area, large heat losses characteristic of prior-art molds are completely avoided, whereby the mold of the present invention may be quickly raised to the molding temperature.

The mold of the present invention generally comprises at least two molding elements defining a cavity into which a thermoplastic material may be placed, each of the elements having a face corresponding to the face of the other element whereby the elements are adapted to be fitted together in a face-to-face relation. Each of the elements are constructed of an electrically conductive and preferably magnetic material, but are insulated from each other at their faces.

The molding elements are provided with conducting means connecting them to each other and each element is connected with one terminal of a source of high-frequency alternating current.

Thus, the mold may be heated by supplying a high-frequency alternating current whereby the elements have a high-frequency alternating current flowing through them in different directions, whereby heat is generated by induction in the conductive elements in the region surrounding the molding cavity.

Referring now to the drawings for a better understanding of the invention, there is shown in FIG. 1 a mold comprising two annular molding elements 1 and 2 having corresponding faces 11 and 21, respectively, and adapted to be positioned in a face-to-face parallel relation. Each of the faces 11 and 21 is provided with a recess 5 and 6, respectively, which communicate with each other when the elements 1 and 2 are positioned in a face-to-face relation to define a molding cavity 3. As illustrated in this figure, the molding cavity has the configuration of a torus, but it will be understood by those skilled in the art that the molding cavity can have a wide variety of other configurations.

Molding elements 1 and 2 are constructed of a conductive, and preferably magnetic, metal such as magnetic or non-magnetic stainless steel, but are insulated from each other by means of gap 7 between faces 11 and 21. The insulation may comprise an air gap between the plates, although it is generally preferred that gap 7 be provided with a material having electrical insulating properties which is stable at molding temperatures. Elements 1 and 2 are connected together by means of conducting means 40 attached to elements 1 and 2 at points 12 and 22, respectively; it is generally preferred that points 12 and 22 be spaced as close together as possible.

Diametrically opposite and in a plane passing through points 12 and 22 are points 13 and 23 located on elements 1 and 2, respectively, which are connected by conducting means 41 and 42, respectively, to a source of high-frequency alternating current (not illustrated in the drawing).

In the operation of the device, the thermoplastic material to be molded on the blank is placed in cavity 3, the mold is closed and a high-frequency alternating current is supplied to conducting means 41 and 42. The current passes through element 1, conducting means 40 and element 2 since this is the only path in which the current can flow. Because of the high frequency and the mutual induction between elements 1 and 2, the current is confined to a narrow region 31 (as shown in FIG. 2) in proximity to the walls 5 and 6 of mold cavity 3, whereby the heat generated is transferred by conduction to the thermoplastic material in cavity 3 with little or no heat loss. After completion of the molding operation, the current is removed and the mold opened.

The voltage of the current and its frequency depend upon the size of the article to be produced and upon the mass of the mold. Frequencies found to be useful are generally within the range of 100 kHz to 10 MHz, although frequencies outside this range may also be employed. It has been found that toric joints may be formed from the mold shown in FIG. 1 at a voltage of 2,000 and a frequency of 500 kHz.

It will be understood by one skilled in the art that various modifications may be made in the mold and heating means of the invention. For example, it is possible to divide element 1 or element 2 or both into separate elements as long as the conductivity through each element is unimpaired.

It will be apparent that we have provided a novel mold and means for heating molds which is simple and economical but which makes it possible to conduct molding operations more rapidly without concommitant loss of large amounts of heat.

It will likewise be apparent that various changes may be made in the details of construction and operation without departing from the spirit of the invention, especially as defined in the following claims.

We claim:

1. A heated mold for heating a material comprising at least two electrically conductive mold elements, each of said elements having a face substantially corresponding to the face of the other element, each of said faces having a recess therein defining a closed molding cavity when said elements are positioned in face-to-face relation, and each of said faces being electrically insulated from the other, conducting means electrically connecting said elements together and means supplying a radio-frequency alternating current with a frequency within the range of 100 kHz to 10 MHz to said elements causing said current to flow from one of said elements to the other through said conducting means generating heat on the faces of said elements adjacent said cavity thereby heating said material.

2. A mold as defined in claim 1 wherein said electrically conductive elements are constructed of a magnetic metal.

3. A mold as defined in claim 2 wherein said conducting means are spaced from said means for supplying said current.

4. A mold as defined in claim 1 wherein said elements are positioned in a spaced face-to-face relation to define a gap between said faces for said electrical insulation.

5. A mold as defined in claim 4 wherein said gap is an air gap.

6. A mold as defined in claim 4 wherein said gap contains an electrical insulating material.

* * * * *